United States Patent [19]
Baugher et al.

[11] Patent Number: 6,101,549
[45] Date of Patent: Aug. 8, 2000

[54] PROXY-BASED RESERVATION OF NETWORK RESOURCES

[75] Inventors: Mark J. Baugher, Portland; Subha Dhesikan, Beaverton; Ema Y. Patki, Hillsboro, all of Oreg.

[73] Assignee: Intel Corporation, Santa Clara, Calif.

[21] Appl. No.: 08/721,833

[22] Filed: Sep. 27, 1996

[51] Int. Cl.[7] .................................................. G06F 15/173
[52] U.S. Cl. ......................... 709/238; 709/239; 709/240; 709/242
[58] Field of Search ...................... 395/200, 187, 395/200.68, 200.69, 200.7; 370/401; 709/238, 245, 228, 250, 249, 239, 240, 242

[56] References Cited

U.S. PATENT DOCUMENTS

| | | | |
|---|---|---|---|
| 4,736,363 | 4/1988 | Aubin et al. | 370/400 |
| 4,825,206 | 4/1989 | Brice, Jr. et al. | 370/216 |
| 4,905,233 | 2/1990 | Cain et al. | 370/237 |
| 5,088,032 | 2/1992 | Bosack | 709/242 |
| 5,371,852 | 12/1994 | Attanasio et al. | 709/245 |
| 5,388,097 | 2/1995 | Baugher et al. | 370/455 |
| 5,509,006 | 4/1996 | Wilford et al. | 370/401 |
| 5,515,513 | 5/1996 | Metzger et al. | 395/200.79 |
| 5,623,601 | 4/1997 | Vu | 395/187.01 |
| 5,729,689 | 3/1998 | Allard et al. | 709/228 |
| 5,835,710 | 11/1998 | Nagami et al. | 209/250 |
| 5,881,246 | 3/1999 | Crawley et al. | 709/238 |

OTHER PUBLICATIONS

Internet Draft, W. Fenner—Xerox PARC and S. Casner—Precept Software, "A 'traceroute' facility for IP Multicast", Nov. 26, 1996, pp. 1–14.
Braden, Zhang, et al. "Resource Reservation Protocol (RSVP)—Version 1 Functional Specification," Internet Draft, RSVP Specification, pp. 1–6, May 6, 1996.
McQuillan, John M. et al. "The New Routing Algorithm for the ARPANET," *IEEE Transactions on Communications*, vol. Com–28, No. 5, May 1980.
McQuillan, John M. et al. "The ARPA Network Design Decisions," *Computer Networks* vol. 1, pp. 243–289 (1977).
Fred Baker, et al. "RSVP Management Information Base," Internet Draft, RSVP MIB, pp. 1–59, Mar. 1996.
C. Hedrick, "Routing Information Protocol," Network Working Group Request for Comments: 1058, pp. 1–33, Jun. 1988.

*Primary Examiner*—Dung C. Dinh
*Assistant Examiner*—Chuong Ho
*Attorney, Agent, or Firm*—Blakely, Sokoloff, Taylor & Zafman LLP

[57] ABSTRACT

A method of communicating messages across a network is provided. A router receives an RSVP (Resource Reservation Protocol) PATH message from a sending host that is directed to a receiving host. Upon identifying the protocol of the incoming PATH message as RSVP, the router accesses a proxy look-up table to identify a proxy host acting on behalf of the receiving host. The router then adds a proxy header to the PATH message and redirects the PATH message to the proxy host by sending the message to a predetermined port. The proxy host receives the PATH message and, in response, sends a resource reservation request (RESV) message onto the network with a proxy header and directed to the predetermined port. The router receives the RESV message, strips off the proxy header, and forwards the RESV message to the sending host as if the message had originated from the receiving host. A proxy host can also send PATH messages on behalf of the sending host. In that case, the proxy host adds a proxy header to the PATH message and directs the PATH message to the predetermined port. The router receives the PATH message, strips off the proxy header, and sends the PATH message to the receiving host as if the PATH message had originated form the sending host. The router also receives RESV messages from the receiving host or its proxy and redirects them to the proxy for the sending host.

34 Claims, 10 Drawing Sheets

FIG. 5
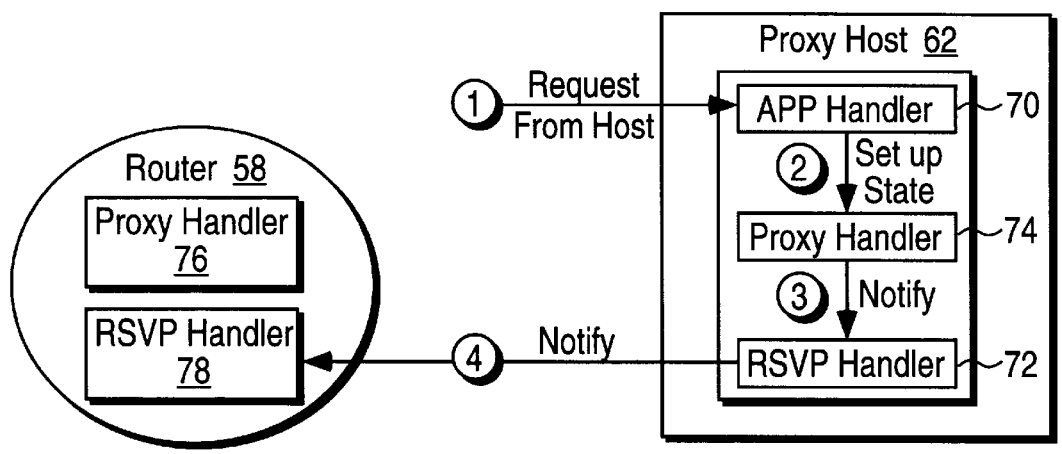
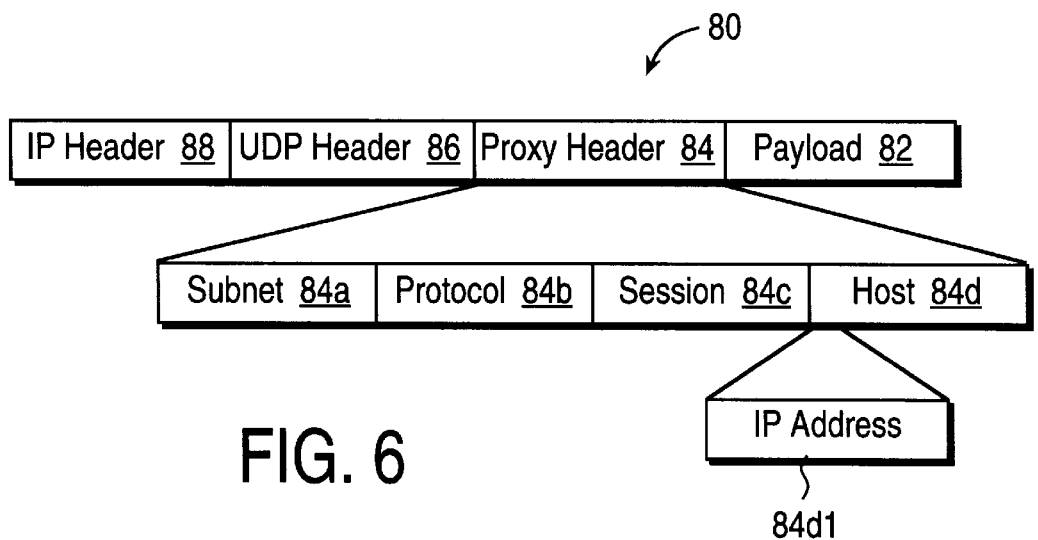
FIG. 6

PROXY-BASED RESERVATION OF NETWORK RESOURCES

FIELD OF THE INVENTION

The present invention pertains to the field of computer networking. More particularly, the present invention relates to the routing of messages for third-party control of network services.

BACKGROUND OF THE INVENTION

In computer networks, certain protocols can be used to allow a network node to reserve network resources. Two Internet protocols which may be used for reserving bandwidth are the Resource Reservation Protocol (RSVP), which is described in the Internet standard, "Resource Reservation Protocol (RSVP)—Version 1 Functional Specification," May 6, 1996 (current draft), and the experimental Internet stream protocol "ST II," which is described in the following Internet requests for comment (RFCs): C. Topolcic, "Experimental Internet Stream Protocol, Version 2 (ST-II)," Oct. 30, 1990, and L. Delgrossi et al., "Internet Stream Protocol Version 2 (ST2) Protocol Specification—Version ST2+", Aug. 11, 1995. These protocols generally define peer-to-peer message exchanges for reserving bandwidth among hosts and between hosts and network routers.

In the case of RSVP, each host generally implements the full range of RSVP messages. However, there are occasions when it may be desirable to use a third host (i.e., a proxy) to make bandwidth requests on behalf of a sending or receiving host. For example, because resource reservation can be expensive, it may be desirable to place such functions under the control of a particular enterprise. In campus internet environments (e.g., intranets), especially those including local area networks (LANs), it may be desirable to control resource reservation requests from a systems-management node. In addition, legacy hosts may not be configured to run the bandwidth reservation protocol, and certain hosts may not easily run multiple network applications concurrently. Third-party control may also be desirable when a user is to be charged for a service, as in the case of electronic transactions, teleconferencing, remote presentation, and multimedia broadcast applications. Hence, what is needed is a technique for implementing proxy control of certain messages on a network, such as resource reservation messages.

Note that some network applications may require multicast routing. Further, it is desirable that third-party controlling reservations be transparent to other hosts in the network. Therefore, what is further needed is a technique which allows a proxy controlling resource reservations to be placed at any point in a network while remaining transparent to other hosts, and which allows multicast routing of reservation messages.

SUMMARY OF THE INVENTION

A method is provided of forwarding a message sent over a network. The message is associated with a certain protocol. After the message is received from the network, a forwarding route for the message is determined based on the protocol.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIG. 5 illustrates control flow between a proxy host and a router for setting up state for third-party bandwidth reservations.

FIG. 6 illustrates a message having a proxy header.

DETAILED DESCRIPTION

A method and apparatus for routing messages for third-party control of network services is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form to facilitate explanation.

According to the present invention, host computer systems and routers in a network are used to implement proxy control of certain functions, such as resource reservation. As will be described below in detail, the present invention therefore includes a proxy protocol operating between a proxy host computer system and a network router.

According to one embodiment, the proxy protocol and other aspects of the present invention are implemented by a CPU in a host computer or a network router executing sequences of instructions stored in a memory. The memory may be random access memory (RAM), read-only memory (ROM), a persistent store, such as a mass storage device, or any combination of these devices. Execution of the sequences of instructions causes the CPU to perform steps according to the present invention.

The instructions may be loaded into the memory of the host computer or router from a persistent store and/or from one or more other host computer systems over a network connection. For example, a source host computer may transmit a sequence of instructions to a target host computer in response to a message transmitted to the source host over a network by the target host. As the target host receives the instructions over the network connection, the target host stores the instructions in memory. The target host may store the instructions for later execution or execute the instructions as they arrive over the network connection. In some cases, the downloaded instructions may be directly supported by the CPU. Consequently, execution of the instructions may be performed directly by the CPU. In other cases, the instructions may not be directly executable by the CPU. Under these circumstances, the instructions may be executed by causing the CPU to execute an interpreter that interprets the instructions, or by causing the CPU to execute instructions which convert the received instructions to instructions which can be directly executed by the CPU.

In other embodiments, hardwired circuitry may be used in place of, or in combination with, software instructions to implement the present invention. Thus, the present invention is not limited to any specific combination of hardware circuitry and software, nor to any particular source for the instructions executed by the target.

Figure 1:
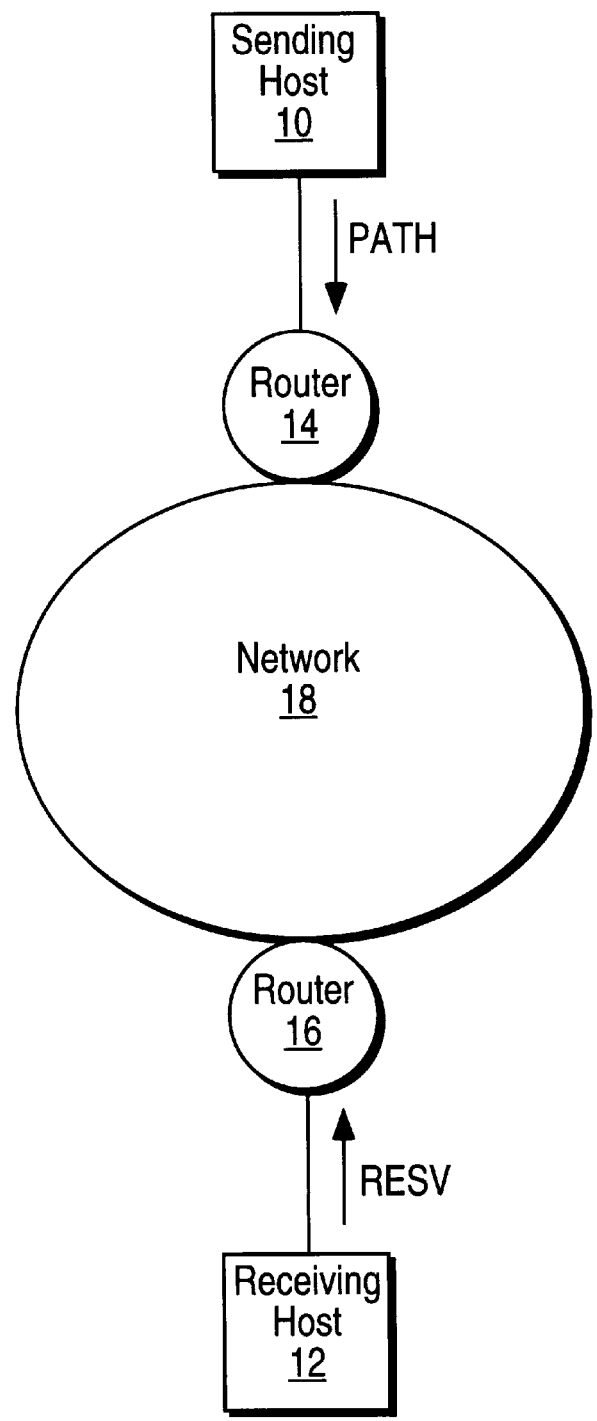
FIG. 1 illustrates a network including hosts sending and receiving bandwidth reservation messages.

FIG. 1 illustrates a network configuration in which Resource Reservation Protocol (RSVP) is implemented. The RSVP protocol is defined in detail in the Internet draft-standard, "Resource Reservation Protocol (RSVP)—Version 1 Functional Specification," May 6, 1996. Although the present invention is henceforth described in terms of RSVP, it should be recognized that the present invention is not limited to use with RSVP or any other particular resource reservation protocol. Further, the present invention is not necessarily limited to the context of performing resource reservations.

In FIG. 1, it is assumed that a sending host 10 and a receiving host 12 each implement RSVP. The sending host 10 is coupled to the network 18 by a router 14. Similarly, receiving host 12 is coupled to the network 18 by router 16. The network 18 may be the Internet, a Wide Area Network (WAN), a local area network (LAN), or any combination thereof. The sending host 10 transmits PATH messages across the network 18 to the receiving host 12. The PATH messages contain information required by the receiving host 12 to allow the receiving host 12 to make bandwidth reservation requests. These bandwidth reservation requests are sent by the receiving host 12 to the sending host 10 in the form of reserve (RESV) messages, which propagate along the same path to the sending host 10 as taken by the PATH messages. Note that RSVP is designed for soft-state—that is, RESV messages must be sent by the receiving message at regular intervals in order to maintain (i.e., "refresh") the reservation.

Figure 2:
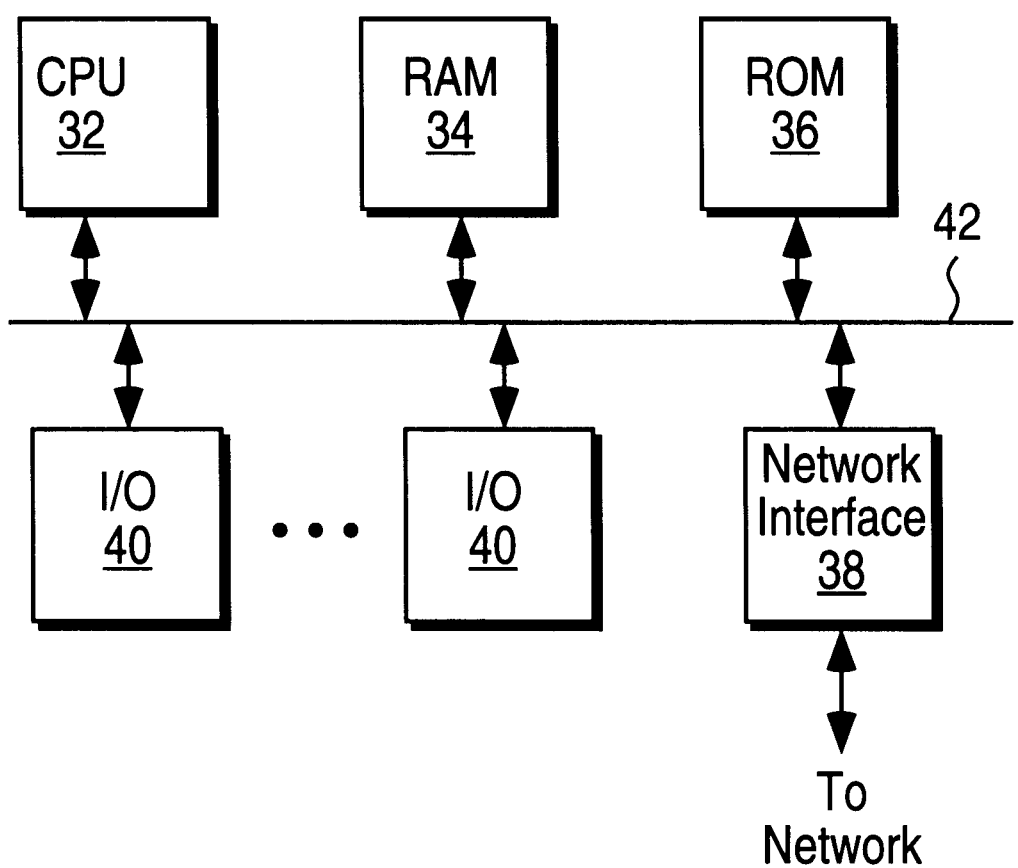
FIG. 2 is a block diagram of a host computer system.

FIG. 2 illustrates a block diagram of a host computer in the network of FIG. 1. The architecture depicted in FIG. 2 is also applicable to a network router used in conjunction with the present invention. The architecture of FIG. 2 includes a central processing unit (CPU) 32, a random access memory (RAM) 34, a read only memory (ROM) 36, a network interface 38, and various input-output (I/O) devices 40, all coupled together by a bus 42. In the case of a host computer, the network interface 38 is used to provide a network connection to a router (an "edge router"). In the case of a router, the network interface 38 is used to provide a network interface to a host computer or another router. Note that the architecture of FIG. 2 is provided only for purposes of illustration, and that a host computer or a router used in conjunction with the present invention is not limited to this specific architecture.

Figure 3:
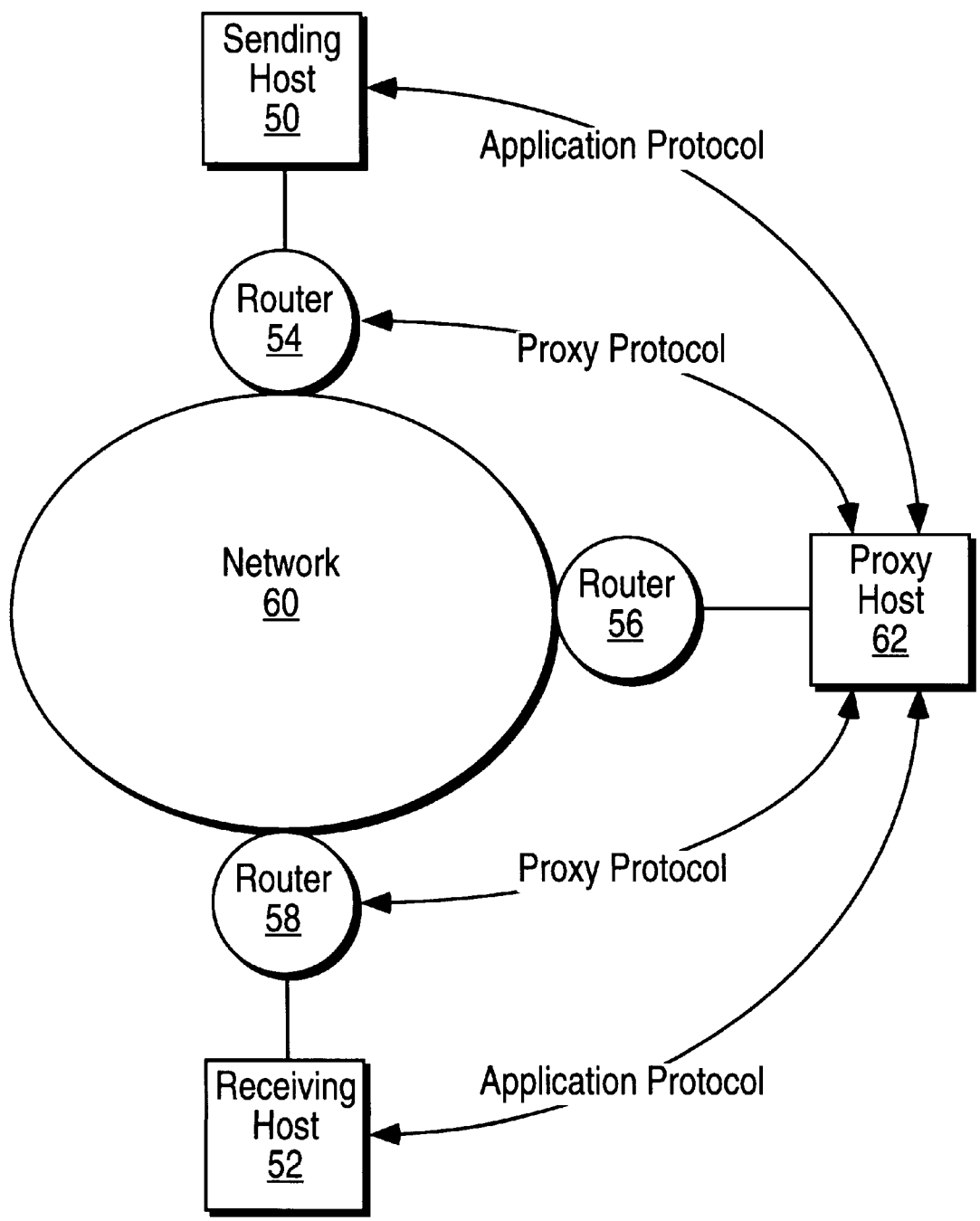
FIG. 3 illustrates a network in which a proxy protocol is implemented to allow a proxy host to control bandwidth reservation functions.

As mentioned above, the present invention includes a proxy protocol operating between a proxy host computer and a network router. The proxy protocol allows a proxy host to send RESV messages on behalf of receiving host, or to send PATH messages on behalf of sending host, or both. FIG. 3 illustrates a network configuration in which the proxy protocol is implemented according to the present invention. Note that FIG. 3 illustrates the protocol exchange among nodes and not the topological relationship between nodes. The proxy protocol is a control protocol that essentially allows protocol tunneling, as will be described below. According to the present invention, a proxy host 62 is coupled to the network 60 via a router 56. The proxy protocol operates between the proxy host 62 and an edge router 54, which connects a sending host 50 to the network 60. Similarly, the proxy protocol operates between the proxy host 62 and another edge router 58, which connects a receiving host 52 to the network 60.

An application protocol also operates between the proxy host 62 and the sending host 50, the receiving host 52, or both. The application protocol serves to initiate the proxy service via a request to proxy host 62 by some other host, such as sending host 50, receiving host 52, or a third host acting on behalf of sending host 50 or receiving host 52. The application protocol may be any transaction protocol and it may be consistent, recoverable, or secure. The purpose of the application protocol is to provide the information that the proxy host 62 needs to perform the proxying services. This information includes the host and sub-net addresses of sending host 50 or receiving host 52, an indication of what service is requested (e.g., RSVP), and the parameters for the requested service. As will be described below, this information is conveyed between the proxy host 62 and router 54 or 58 (or an intermediate node along the route among the hosts).

The proxy protocol of the present invention allows proxy host 62 to send RESV messages on behalf of receiving host 52, or to send PATH messages on behalf of sending host 50, or both. If proxy host 62 is used to send RESV messages on behalf of receiving host 52, then the router 58 is configured to intercept PATH messages sent by sending host 50 and to redirect the PATH messages to proxy host 62. In that case, when a RESV message is received by router 58 from proxy host 62, router 58 will bind the RESV message to the interface that connects router 58 to receiving host 52 and transmit the RESV message along the path to sending host 50. That is, the payload of the message is processed by router 58 as if it were received across that particular interface. Similarly, for the case in which proxy host 62 is used to send PATH messages on behalf of sending host 50, router 54 will bind the PATH messages to the interface between router 54 and sending host 50 and transmit the PATH messages to receiving host 52. In that case, when router 54 receives a RESV message originating from receiving host 52, router 54 will redirect the RESV message to proxy host 62.

The route between sending host 50 and receiving host 52 may be either a unicast or multicast route. Hence, the present invention must be compatible with network multicast protocols. In the case where sending host 50 is a sender to a multicast group, the message will be sent to multiple end nodes. In that case, receiving host 52 can be thought of as a group of end nodes, and router 58 can be thought of as a group of intermediate nodes.

Note that in a diverse network environment, such as where the sending host communicates with the receiving host 52 over the Internet, there may be different types of network connections between different nodes. For example, sending host 50 or receiving host 52 may be connected to their respective edge routers 54 and 58 via a standard Ethernet connection, while the connections between routers over the Internet may have T1, T3, OC3, or other connections. The present invention allows a proxy host 62 to be located at any point in the network, regardless of these differing connection types.

Figure 4A:
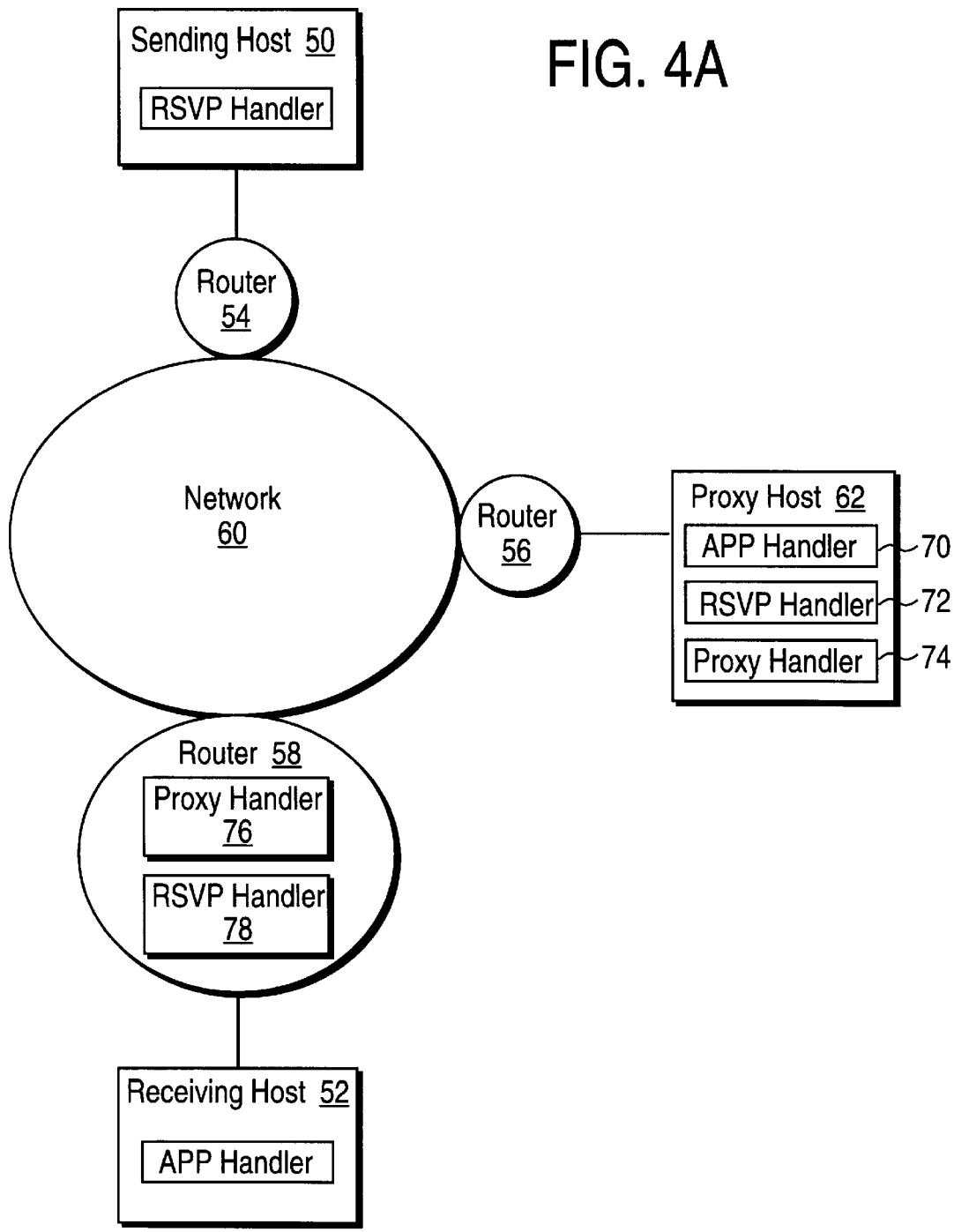
FIGS. 4A and 4B illustrate software modules used to allow a proxy host to perform bandwidth reservation functions.
Figure 4B:
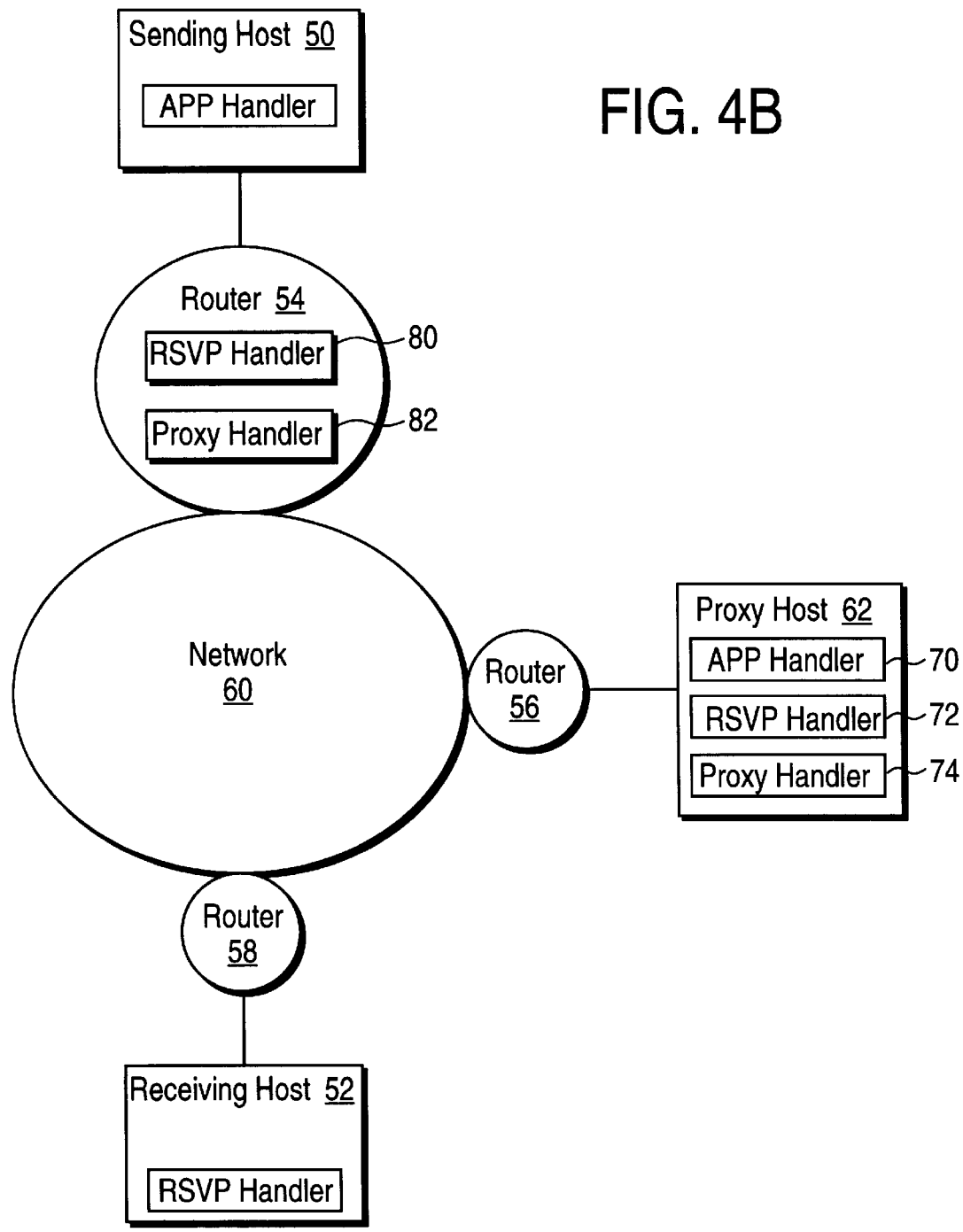

FIGS. 4A and 4B illustrate an example of the distribution of software used to implement the present invention. FIG.

4A illustrates the distribution of software for the case in which the proxy host 62 is used only to send RESV messages on behalf of receiving host 52. In that case, the application protocol is implemented by an application handler operating in each of the sending host 50, receiving host 52, and proxy host 62. The proxy protocol operates between proxy host 62 and the edge router 58 associated with receiving host 52. Consequently, a proxy handler operates in both the proxy host 62 and the router 58 to implement the proxy protocol. An RSVP handler is required to implement the RSVP protocol. Without the present invention, the RSVP handler generally would be required in both the sending host 50 and receiving host 52. However, because proxy host 62 is used to send RESV messages on behalf of receiving host 52, there is no need to include the RSVP handler in the receiving host 52. Instead, an RSVP handler 72 operates in proxy host 62.

FIG. 4B illustrates the distribution of software for the case in which the proxy host 62 is used only to send PATH messages on behalf of sending host 50. In this case, the application protocol is implemented by an application handler operating in each of sending host 50 and proxy host 62. A proxy handler operates in both proxy host 62 and router 54 to implement the proxy protocol. An RSVP handler operates in receiving host 52 and proxy host 62, but is not required in sending host 50 because proxy host 62 provides proxy services for sending host 50.

As noted above, the application protocol is used to supply proxy host 62 with the information that it requires to perform proxy services. Referring now to FIG. 5, the proxy service is initiated by a request from a host to proxy host 62 via the application protocol. In response to this request, the application handler 70 of proxy host 62 sets up state in the proxy handler 74 of proxy host 62. The act of setting up state includes providing the information mentioned above, i.e., an indication of the requested service, the host and sub-net addresses of the hosts receiving the proxy service, and the parameters for the requested service. The "state" maintained by the proxy handler 74 is a proxy table entry. After setting up state, the proxy handler 74 then notifies the RSVP handler 72 of proxy host 62, which responds by setting up state in the RSVP handler of the appropriate edge router (i.e., router 54 or 58). More specifically, the RSVP handler 72 of proxy host 62 sets up state in the RSVP handler 78 of router 58 if proxy host 62 is to send RESV messages on behalf of receiving host 52, or in the RSVP handler 80 of router 54 if proxy host 62 is to send PATH messages on behalf of sending host 50. FIG. 5 illustrates the former case.

The proxy protocol can be implemented in at least two embodiments. In the first embodiment, messages communicated between the proxy host 62 and edge router 54 or 58 for purposes of performing proxy services are encapsulated as UDP (User Datagram Protocol) datagrams. This embodiment is therefore referred to as "UDP encapsulation." UDP datagrams between proxy host 62 and router 54 or 58 are directed to a predetermined port recognized by both proxy host 62 and router 54 or 58. In an alternative embodiment, messages communicated between the proxy host 62 and router 54 or 58 are communicated as raw transmissions. The "raw transmission" embodiment employs the use of a new protocol identifier (ID) in the Internet Protocol (IP) header and requires a new protocol handler in the Internet protocol implementation.

Within either the UDP encapsulation or raw transmission embodiment, any of at least three techniques may be used. In the first technique, the particular control protocol (e.g., RSVP or ST II) is extended by adding a new message to that protocol. In a second technique, an entirely new protocol is implemented to include the proxy function by design (i.e., a new protocol that replaces RSVP or ST II).

The third technique is referred to herein as "proxy encapsulation." Proxy encapsulation supports a variety of protocols, such as RSVP, by including the control message (e.g., a PATH or RESV message) as a payload that is preceded by a proxy header. Hence, the control protocol is carried transparently, but the proxy host must be able to correctly format and process the control message according to the rules of the particular protocol. Thus, with proxy encapsulation, the protocol exchanges for the proxy functions are separated from the protocol exchanges needed to implement a particular control protocol, such as RSVP. In one embodiment, proxy encapsulation is implemented as a "tunnel" that routes messages between edge-routers based upon both protocol and Internet Protocol (IP) address. Referring again to FIG. 3, this method resembles a tunnel between proxy host 62 and router 54 or router 58.

The following description assumes that proxy encapsulation with UDP encapsulation is used. FIG. 6 illustrates the format of messages sent between proxy host 62 and router 54 or 58. Certain messages received by router 54 or 58 from either sending host 50 or receiving host 52 include a payload comprising an RSVP control message and an IP header. Router 54 or 58 therefore adds a UDP header 86 and a proxy header 84 to such messages. The UDP header 86 contains a port identifier that is set to the predetermined port discussed above. The proxy header 84 includes a sub-net address 84a, a protocol ID 84b, a session identifier 84c, and a host address 84d. The host address 84d includes the IP address 84d1 of the host that is receiving the proxy service.

The proxy header 84 and the control message in the payload 82 are processed by the proxy handler 74 of proxy host 62. The proxy header 84 and payload 82 are sent in a UDP datagram directed to the predetermined port, which is specified in the UDP header 86. When router 54 or 58 receives a message directed to this port, it extracts the proxy header 84 and binds the message to the sub-network interface indicated in the sub-net field 84a of the proxy header 84. Preferably, the sub-net field 84a is an IP sub-net address that identifies the interface of the host or hosts receiving the proxy service. The payload 82 is processed as if it were received across that particular subnetwork interface. The protocol field 84b identifies the protocol of the payload. In the case of RSVP, the protocol field 84b is the IP protocol ID for RSVP, which is protocol "46." Messages received by router 54 or 58 from sending host 50 or receiving host 52 are tested for possible redirection by matching the incoming protocol ID field 84b with each protocol value that was previously received in a proxy header from proxy host 62. The session field 84c identifies a bandwidth reservation session or connection of the bandwidth management protocol (i.e., RSVP). For example, the session field 84c may contain the IP address of one or more receiving hosts.

On initialization, router 54 or 58 caches the protocol session and host fields 84b, 84c, and 84d in a look-up table, which is used to look up the address of the proxy host 62 for these fields. That is, when a message that matches the subnet, protocol ID, and session fields is received, router 54 or 58 uses the session information to perform a table look-up to retrieve the IP address and outgoing interface of the proxy host 62. Router 54 or 58 will then send the message to the proxy host 62 rather than to the destination host. When router 54 or 58 receives messages from proxy host 62, the protocol field 84b identifies the bandwidth reservation protocol handler 78 in router 54 or 58, and serves as a filter for incoming messages. Note that no unique messages need to be defined in the proxy protocol.

Router 54 or 58 and the host tables must be properly initialized and maintained. For example, when the bandwidth reservation session or connection is established, the table entries used for redirection must be established by the proxy protocol. Consequently, when the session or connection is disestablished, the entries must be deleted. When state is established or refreshed for the bandwidth reservation protocol, this condition is recognized by the proxy protocol handler, and the table entry for redirecting control messages is created or maintained. This result is achieved by enabling the proxy protocol handler to correctly parse bandwidth reservation messages.

Figure 7:
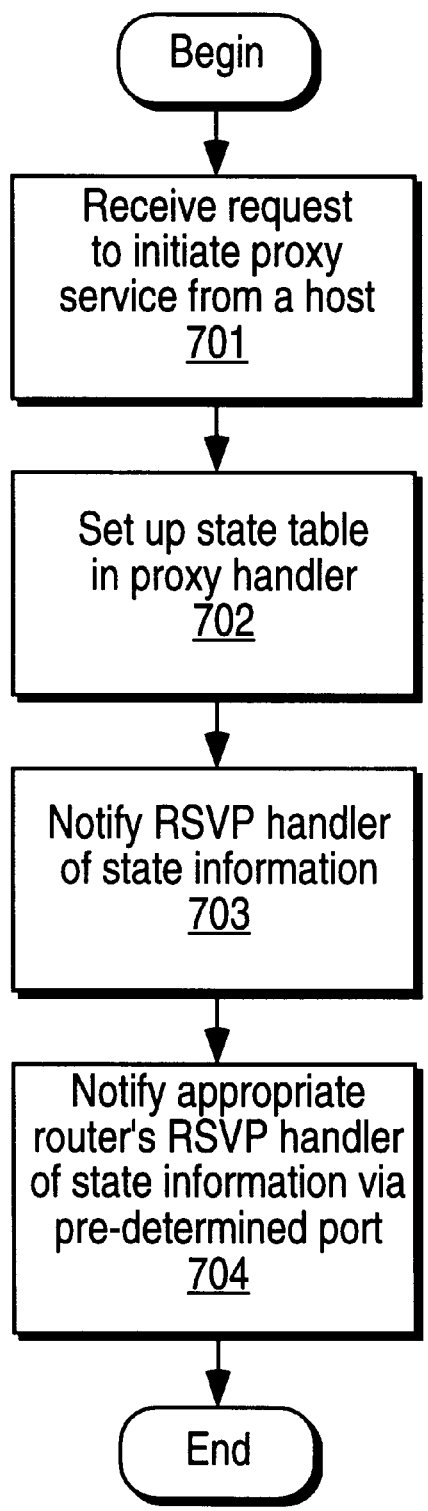
FIG. 7 is a flow diagram illustrating a routine for configuring network devices to implement a proxy service for bandwidth reservation.

FIG. 7 illustrates a routine performed by the proxy host 62 for setting up proxy services for an RSVP bandwidth reservation session. The routine is used to set up the proper state tables in both the proxy host 62 and router 54 or 58. Initially, proxy host 62 receives a request from another host to initiate the proxy service (step 701). In response, proxy host 62 sets up a state table in its proxy handler 74 (step 702). The RSVP handler 72 of proxy host 62 is then notified of this state information (step 703). Finally, the RSVP handler of router 54 or 58 is notified of the state information via the predetermined port (step 704). In response to receiving this information, router 54 or 58 then sets up state. Note that the step of proxy host 62 setting up a state table in its proxy handler 74 (step 702) includes the application protocol's providing the parameters of the proxy header 84 to the proxy handler 74 in addition to other parameters needed by the bandwidth reservation protocol.

Thus, when a message from the proxy hosts' RSVP handler is intercepted by its proxy handler prior to transmission onto a sub-network, the proxy handler will inspect the message, establish its tables for the session, encapsulate the message in a proxy header, and send it as a UDP datagram to the predetermined port in router 54 or 58.

The interface between proxy host 62 and router 54 or 58 comprises the parameters in the proxy header and the predetermined UDP port for the proxy service. The proxy interface therefore is not specific to a particular bandwidth management protocol. Rather, it is sufficiently generalized to allow variety bandwidth management protocols to be implemented. However, the particular proxy handler is specific to particular bandwidth reservation protocol, because the bandwidth reservation protocol may use either connection-oriented service or datagram, and because the bandwidth reservation protocol may use either hard-state or soft-state depending upon the particulars of the bandwidth reservation specification. RSVP uses soft-state, and RSVP messages are sent as UDP datagrams in one embodiment. "Soft-state" is defined herein as the requiring of periodic refresh messages to maintain state. Hence, a proxy handler for RSVP must parse UDP datagrams and must implement soft-state proxy table entries that are subject to deletion after a predetermined time interval in the absence of periodic refresh messages. Similarly, RSVP teardown and error messages may also result in the deletion of proxy state for an RSVP proxy handler.

As mentioned above, the state maintained by the proxy handler 74 is a proxy table entry. In proxy host 62, the proxy handler 74 will examine protocol "46" (RSVP) messages that are sent from, or received for, the RSVP handler 72. Note that this procedure requires minimal overhead, because it occurs on a control path and not on a data path—RSVP messages are typically sent once every thirty seconds by default.

The proxy handler 76 in router 58 (or proxy handler 81 in router 54) inspects incoming messages for a match on the protocol field 84b, such as protocol 46 for RSVP messages. This procedure also requires minimal overhead, because session-level bandwidth reservation messages are sent infrequently, such as once every thirty seconds. As long as state is maintained in the RSVP protocol handler, incoming messages that match on the protocol session and host fields 84b, 84c, and 84d are redirected to proxy host 62, as described above. Hence, the tuple <protocol, session, host>maps to a unique proxy host address inside router 54 or 58.

Figure 8:
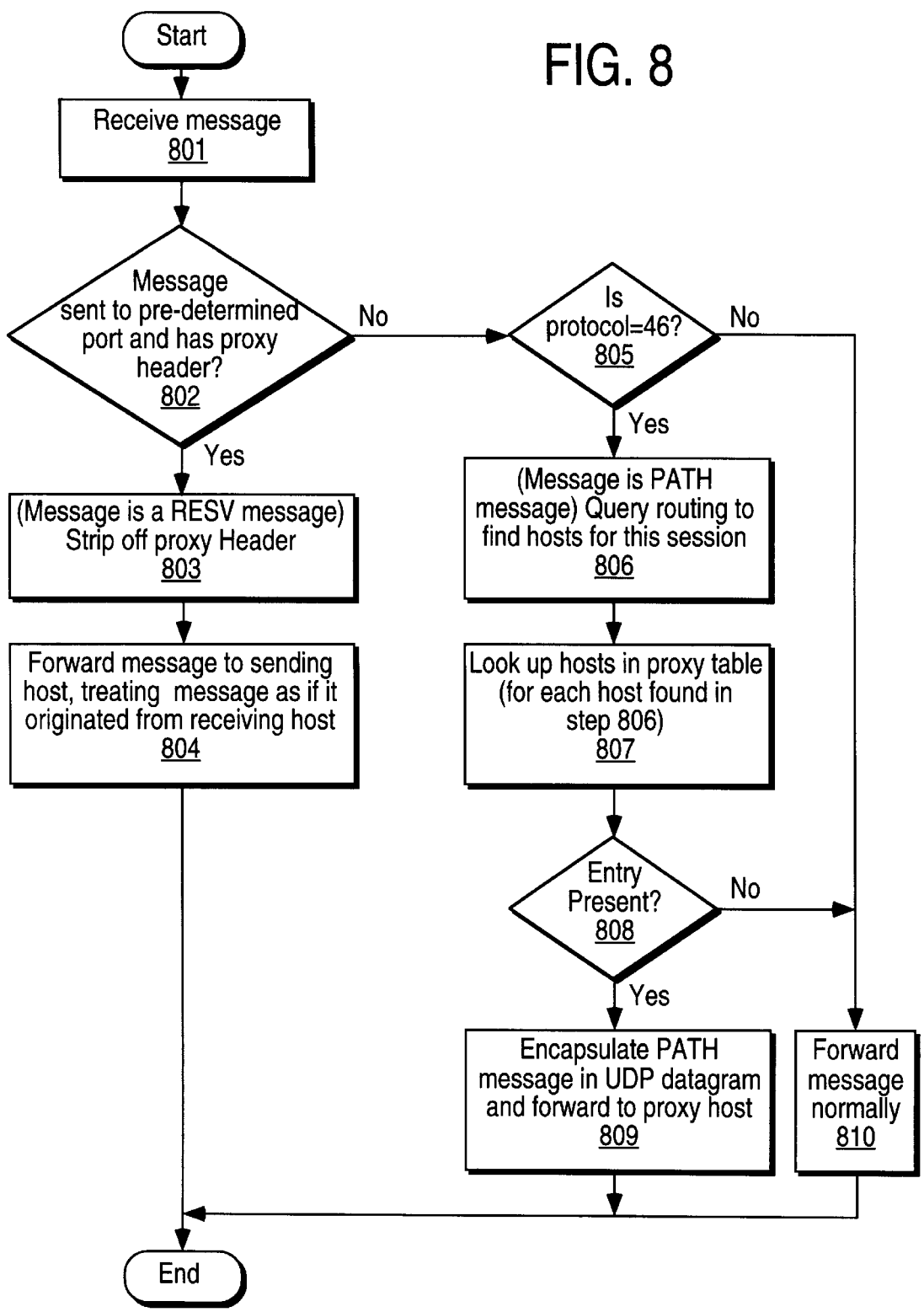
FIG. 8 is a flow diagram illustrating a routine performed by a router for a case in which a proxy host sends RESV messages on behalf of a receiving host.

FIG. 8 illustrates a routine performed by router 58 for the case in which proxy host 62 sends only RESV messages on behalf of receiving host 52. Initially, a message is received by router 58 via its network connection (step 801). If the message was directed to the predetermined port and has a proxy header (step 802), then the message is a RESV message. Consequently, the proxy header is stripped off the message (step 803). After the proxy header is stripped off, router 58 forwards the message to sending host 50, treating the message as if it originated from receiving host 52. If the incoming message was not directed to the predetermined port or did not have a proxy header (step 802), then router 58 determines whether the protocol field of the message indicates protocol "46." If not, the message was neither a PATH message nor a RESV message; consequently, the message is forwarded normally to its indicated destination (step 810). If the message is a protocol "46" message but has no proxy header or is not directed to the predetermined port, then the message is a PATH message. Consequently, router 58 queries its routing table to identify the hosts for the indicated session (step 806). If one or more hosts are identified for the session, router 58 identifies a proxy host from a proxy look-up table for each of those hosts (step 807). Assuming there is a proxy host entry for a given legacy host (step 808), then the PATH message is encapsulated in a UDP datagram and forwarded to proxy host 62 by directing the message to the predetermined port (step 809). If no proxy host entry is present in the proxy table (step 808), then the message is forwarded normally to its indicated destination (step 810).

Figure 9:
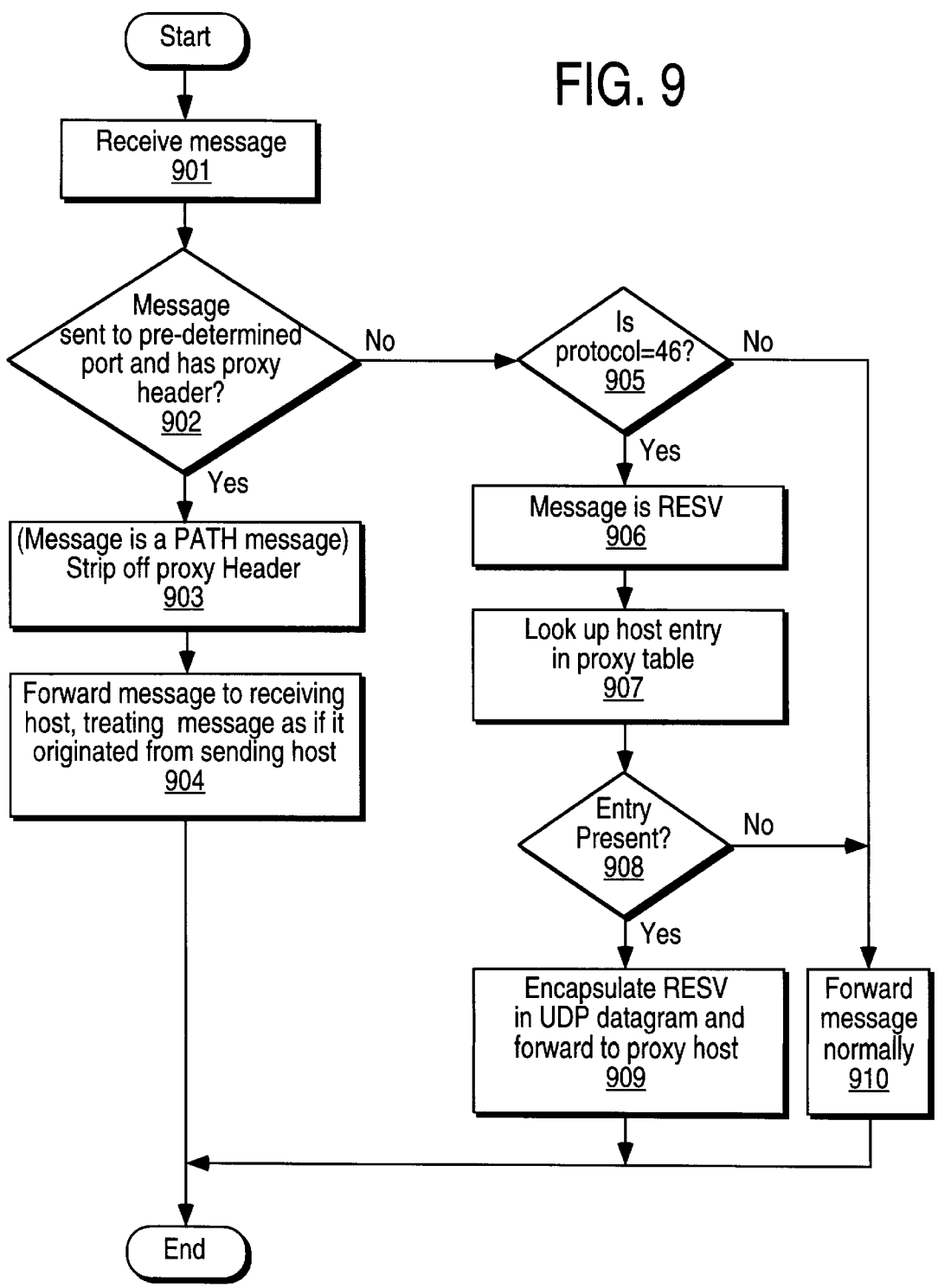
FIG. 9 is a flow diagram illustrating a routine performed by a router for a case in which a proxy host sends PATH messages on behalf of a sending host.

FIG. 9 illustrates a routine performed by router 54 for the case in which proxy host 62 sends only PATH messages on behalf of sending host 50. Initially, an incoming message is received by router 54 (step 901). If the message was directed to the predetermined port and has a proxy header (step 902), then the incoming message is a PATH message. In that case, the proxy header is stripped off the message by router 54 (step 903). Next, the PATH message is forwarded to receiving host 52, with router 54 treating the message as if it had originated from sending host 50 (step 904). If (in step 902) the message is not directed to the predetermined port or does not have a proxy header, then router 54 determines whether the protocol field of the message indicates protocol "46" (step 905). If so, then the message is determined to be a RESV message (step 906). Consequently, router 54 looks up any host entries in the proxy table for the message (step 907). If a host entry is present (step 908), then the RESV message is encapsulated in a UDP datagram and forwarded to proxy host 62 (step 909). If no entry is present, then the message is forwarded normally to its indicated destination (step 910).

Figure 10:
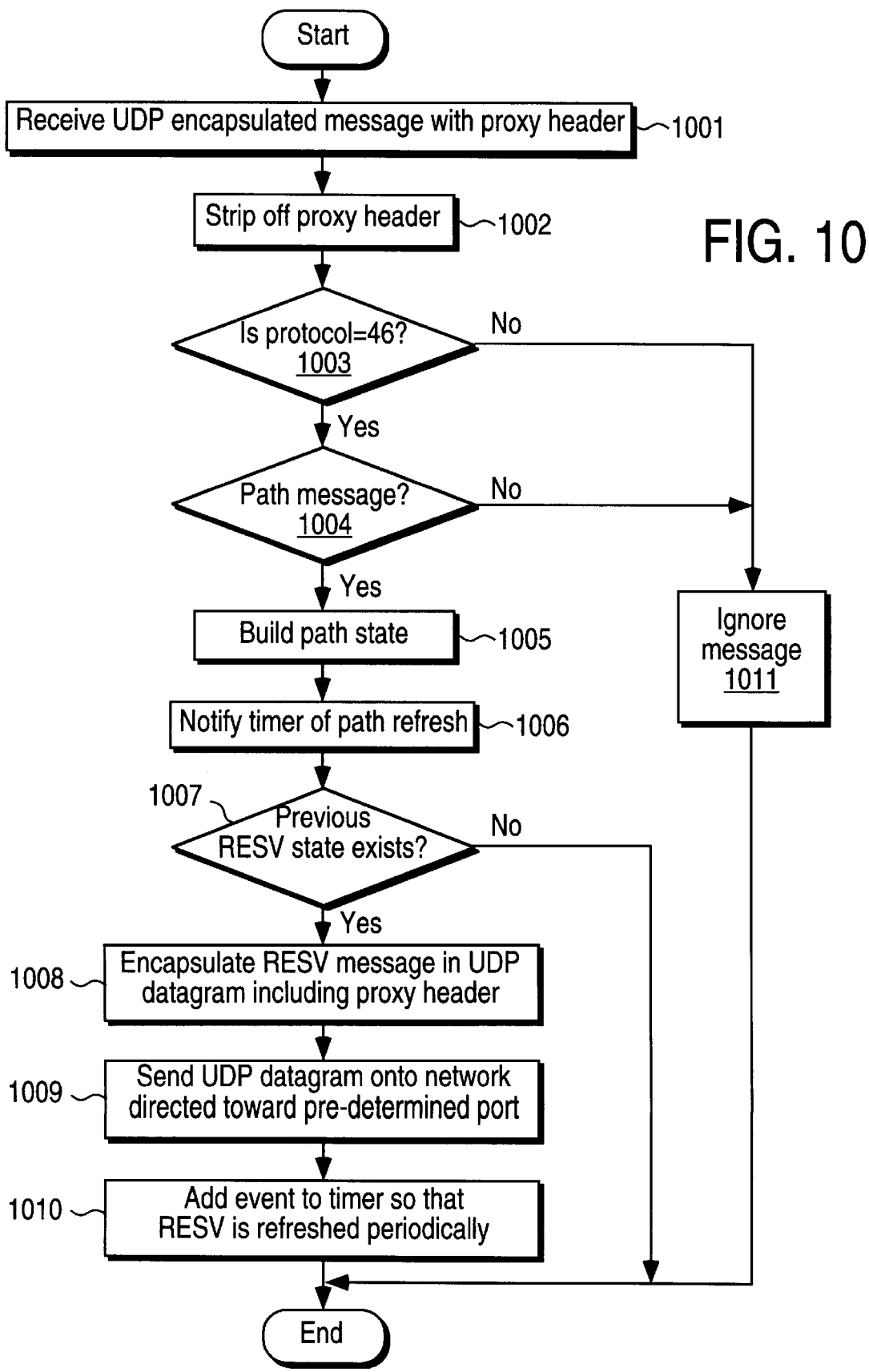
FIG. 10 is a flow diagram illustrating a routine performed by a proxy host for a case in which the proxy host sends RESV messages on behalf of a receiving host.

FIG. 10 illustrates a routine performed by proxy host 62 for the case in which proxy host 62 sends only RESV messages on behalf of receiving host 52. Initially, proxy host 62 receives a UDP encapsulated message having a proxy header (step 1001). The proxy header is stripped off (step 1002), and proxy host 62 determines whether the protocol field indicates protocol "46" (step 1003). If not, the message is ignored (step 1011). If protocol "46" is indicated, proxy host 62 determines whether the message is a PATH message (step 1104). If the message is not a PATH message, then the message is ignored (step 1011). If, however, the message is a PATH message, then proxy host 62 builds path state based on the message (step 1005). That is, proxy host 62 stores information necessary to maintain state based upon the PATH message. The RSVP handler 72 of proxy host 62 implements a timer which controls the periodic refresh interval of RSVP state. Consequently, after building path state (step 1005), the timer is notified that there has been a PATH refresh (step 1006). Assuming a RESV state has been previously set up for this PATH (step 1007), a RESV message is then encapsulated in a UDP datagram with a proxy header (step 1008). The UDP datagram is then transmitted onto the network directed to the predetermined port (step 1009). An event is then added to the timer of the RSVP handler 72 so that the RESV state is periodically refreshed (step 1010). If (in step 1007) no previous RESV state was set up for the PATH, then the routine ends.

Note that, as mentioned above, proxy host 62 can be used to send PATH messages on behalf of sending host 50. In this case, proxy host 62 would periodically send out PATH messages encapsulated in UDP datagrams directed to the predetermined port. Router 54 would receive the UDP datagrams, strip off the proxy headers, and forward the PATH messages across the network 60. Similarly, proxy host 62 would receive periodic RESV messages that have been redirected to it by router 54 encapsulated in UDP datagrams. Note further that the same proxy host can be used to send both RESV messages on behalf of a sending host and PATH messages on behalf of a receiving host, in which case the separate routines described above can be combined.

Thus, a method and apparatus for routing messages for third-party control of network services has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of forwarding a message sent over a network, the method comprising:
    receiving the message, the message having a protocol identifier indicating a protocol of the message; and
    selecting one of a plurality of selectable forwarding routes for the message based on the protocol identifier, including altering a route of the message if the protocol identifier of the message indicates a resource reservation protocol.

2. A method according to claim 1, further comprising the step of forwarding the message onto the network along the selected forwarding route, wherein the step of forwarding comprises:
    encapsulating the message in a User Datagram Protocol (UDP) datagram; and
    forwarding the UDP datagram onto the network along the forwarding route.

3. In a routing device on a network, a method of communicating messages across the network, the method comprising:
    receiving a first message sent across the network, wherein the first message includes a protocol identifier, the first message being directed to a first host in the network along a route; and
    redirecting the first message to a proxy for the first host by altering the route of the first message if the protocol identifier corresponds to a resource reservation protocol.

4. A method according to claim 3, further comprising the steps of:
    receiving a second message sent by the proxy on behalf of the first host; and
    transmitting the second message to a second host in the network, in such a manner that the presence of the proxy is hidden from the second host.

5. A method according to claim 4, wherein the second message is a resource reservation request.

6. A method according to claim 5, wherein the step of redirecting the first message to the proxy comprises the step of adding a proxy header to the first message.

7. A method according to claim 3, wherein the redirecting step further comprises redirecting the first message to the proxy for the first host if the protocol identifier corresponds to a resource reservation protocol, by selecting one of a plurality of possible forwarding routes for the message.

8. A method of forwarding messages on a network, the method comprising:
    receiving a message generated along a route from a first host on the network, the message directed along a route to a second host on the network, the message including a protocol identifier;
    determining whether the message corresponds to a resource reservation protocol based on the protocol identifier;
    if the message corresponds to the resource reservation protocol, then:
    identifying a proxy host for the second host;
    selecting one of a plurality of selectable forwarding routes for the message according to the identified proxy host; and
    forwarding the message to the proxy host along the selected forwarding route.

9. A method according to claim 8, wherein the step of forwarding the message to the proxy comprises forwarding a User Datagram Protocol (UDP) datagram to the proxy, the UDP datagram including the message.

10. A method according to claim 8, wherein the step of forwarding the message to the proxy host comprises adding a proxy header to the message.

11. A method of providing proxy services for a device on a network, the method comprising:
    receiving at a proxy host on the network a path message originating from a first host on the network, the path message directed to a second host on the network;
    identifying a protocol of the path message from a protocol identifier of the message; and
    if the protocol of the path message corresponds to a predetermined protocol, transmitting from the proxy host a resource reservation request onto the network on behalf of the second host, the resource reservation request directed to the first host.

12. A method according to claim 11, further comprising the step of periodically retransmitting the resource reservation request onto the network on behalf of the second host.

13. A method according to claim 11, wherein the path message has a proxy header, and wherein the step of identifying the protocol of the message comprises the step of examining the proxy header.

14. A method according to claim 11, wherein the step of transmitting the resource reservation request onto the network comprises the steps of:
encapsulating the resource reservation request in a User Datagram Protocol (UDP) datagram; and
transmitting the UDP datagram onto the network.

15. A method according to claim 11, wherein the step of transmitting the resource reservation request onto the network comprises the step of directing the resource reservation request to a predetermined port of a particular device on the network.

16. A device for transmitting and receiving messages on a network, the device comprising:
a processor; and
a memory coupled to the processor, the memory having stored therein instructions which, when executed by the processor, cause the device to:
receive a message from a first host on the network, the message directed to a second host on the network, the message having a protocol identifier; and
redirect the message to a proxy for the second host if the protocol identifier indicates a resource reservation protocol.

17. A device for transmitting and receiving messages on a network, the device comprising:
a processor; and
a memory coupled to the processor, the memory having stored therein instructions which, when executed by the processor, cause the device to:
receive a message generated on behalf of a first host on the network, the message directed to a second host on the network, the message conforming to a protocol;
determine whether the protocol of the message matches a resource reservation protocol;
if the protocol of the message matches the resource reservation protocol, then:
access information stored in the memory identifying a proxy host for the second host; and
forward the message to the proxy host.

18. A device according to claim 17, wherein the instructions which cause the device to forward the message to the proxy comprise instructions which, when executed by the processor, cause the device to send a User Datagram Protocol (UDP) datagram to the proxy, the UDP datagram including the message.

19. A device for transmitting and receiving messages on a network, the device comprising:
a processor; and
a memory coupled to the processor, the memory having stored therein instructions which, when executed by the processor, cause the device to:
receive a message from a proxy host on the network, the proxy host for transmitting messages associated with reservation of network resources on behalf of a first host on the network, the message directed to a second host on the network;
determine if the message has a proxy header; and if the message has a proxy header, then:
remove the proxy header from the message; and
forward the message along a route to the second host.

20. A device according to claim 19, wherein the message is a resource reservation request.

21. A device according to claim 20, wherein the instructions which cause the device to forward the message to the second host comprise instructions which, when executed by the processor, cause the device to send a User Datagram Protocol (UDP) datagram along the route to the second host, the UDP datagram including the resource reservation request.

22. A device for transmitting and receiving messages on a network, the device comprising:
a processor; and
a memory coupled to the processor, the memory having stored therein instructions which, when executed by the processor, cause the device to:
receive a message associated with network resource reservation and originating from a proxy host on the network, the proxy host transmitting the message on behalf of a first host on the network, the message directed along a route to a second host on the network; and
forward the message along the route to the second host in such a manner that the proxy host is transparent to the second host.

23. A device according to claim 22, wherein the message is a resource reservation request.

24. A device according to claim 22, wherein the message is a path message associated with a resource reservation protocol.

25. A proxy host for transmitting and receiving messages on a network, the proxy host comprising:
a processor; and
a memory coupled to the processor, the memory having stored therein instructions which, when executed by the processor, cause the proxy host to:
receive a first message generated by a first host on the network, the first message directed to a second host on the network, the first message including a proxy header;
identify a protocol of the message from the proxy header;
if the protocol of the header matches a resource reservation protocol, then transmit a second message onto the network on behalf of the second host, the second message directed along a route to the first host.

26. A device according to claim 25, wherein the first message is a path message and the second message is a bandwidth reservation request for reserving bandwidth for the second host.

27. A device according to claim 25, wherein the instructions further comprise instructions which, when executed by the processor, cause the proxy host to periodically retransmit the second message onto the network on behalf of the second host.

28. A device according to claim 25, wherein the instructions which cause the proxy host to transmit the second message onto the network comprise instructions which, when executed by the processor, cause the proxy host to:
encapsulate the second message in a User Datagram Protocol (UDP) datagram; and
transmit the UDP datagram onto the network.

29. A device according to claim 28, wherein the instructions which cause the proxy host to transmit the second message onto the network comprise instructions which, when executed by the processor, cause the proxy host to direct the second message to a predetermined destination port of a device on the network that is incident to the route between the first host and the second host.

30. A machine-readable program storage medium tangibly embodying a sequence of instructions, the instructions executable by a processor to perform method steps for forwarding a message sent over a network, the method steps comprising:

receiving the message sent over the network, the message having a protocol identifier;

selecting one of a plurality of possible forwarding routes for the message if the protocol identifier corresponds to a resource reservation protocol, wherein said selecting includes altering a specified route of the message if the protocol identifier corresponds to a resource reservation protocol; and forwarding the message onto the network along the selected forwarding route.

31. A program storage medium according to claim 30, wherein the step of forwarding comprises:

encapsulating the message in a User Datagram Protocol (UDP) datagram; and forwarding the UDP datagram onto the network along the forwarding route.

32. A program storage medium according to claim 30, wherein the message indicates a destination host, and wherein the selecting step comprises the step of identifying a proxy host designated to receive the message on behalf of the destination host.

33. A method of forwarding messages over a network, the method comprising:

receiving a message sent over the network, the message the message having a protocol identifier, the protocol identifier including a value identifying the protocol of the message;

determining whether the value corresponds to a resource reservation protocol;

if the value corresponds to a resource reservation protocol, then selecting a first forwarding route for the message from a plurality of selectable forwarding routes by altering a specified route of the message; and if the value does not correspond to a resource reservation protocol, then selecting a second forwarding route for the message from the plurality of selectable forwarding routes.

34. A method according to claim 33, further comprising, if the value corresponds to the resource reservation protocol;

encapsulating the message in a User Datagram Protocol (UDP) datagram; and forwarding the UDP datagram onto the netwrok along the first forwarding route.

* * * * *

UNITED STATES PATENT AND TRADEMARK OFFICE
CERTIFICATE OF CORRECTION

PATENT NO. : 6,101,549
DATED : August 8, 2000
INVENTOR(S) : Baugher et al.

It is certified that error appears in the above-identified patent and that said Letters Patent is hereby corrected as shown below:

Column 14,
Lines 3-4, delete "the message the message" and insert -- the message --.

Signed and Sealed this

Seventh Day of May, 2002

Attest:

Attesting Officer

JAMES E. ROGAN
Director of the United States Patent and Trademark Office